Feb. 7, 1950     W. SHERWOOD     2,496,314
LEAD GAUGE
Filed Sept. 27, 1944
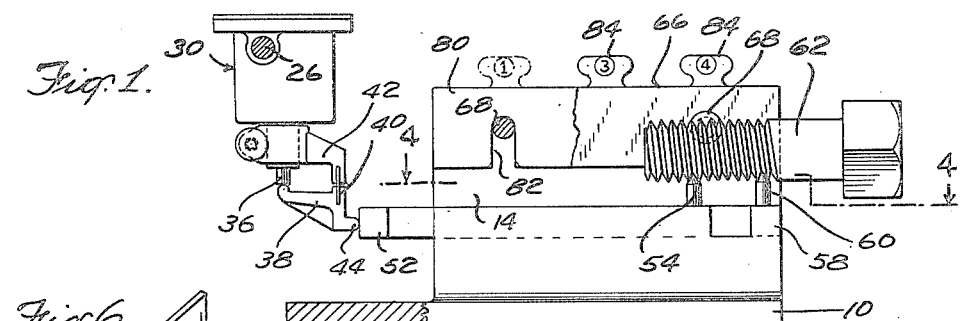
INVENTOR
WALTER SHERWOOD
BY
Moses, Nolte, Crews + Berry
ATTORNEYS Patented Feb. 7, 1950

2,496,314

UNITED STATES PATENT OFFICE 2,496,314

LEAD GAUGE

Walter Sherwood, Hempstead, N. Y., assignor to The Farmingdale Corporation, a corporation of New York Application September 27, 1944, Serial No. 555,995

4 Claims. (Cl. 33—199)

This invention relates to gauges and particularly to gauges for determining errors in the lead or pitch of threaded members.

An object of the invention is to provide a gauge of the character described which shall be exceedingly simple and rugged in construction so as to lend itself to use in production jobs where large numbers of threaded members are to be gauged.

Another object of the invention is to provide an extremely simple and positive means for adjusting the gauge so that it may be used to test screws of different diameters. In this connection it is important, particularly on a production job, that where the adjustment has once been made for a given diameter of screw, the adjustment must be maintained while all the screws of that diameter are being tested. The adjustment must be accurate, positive and permanent.

Other objects and advantages will appear in the course of the following description of one preferred embodiment of the invention chosen to illustrate the principles thereof.

In the accompanying drawings,

Figure 1 is a side elevation of one construction embodying the invention, portions being broken away as indicated by line 1—1 of Fig. 2;

Figure 2 is a plan view of the gauge shown in Fig. 1.

Figure 3 is an end view of the construction looking from the left of Figures 1 and 2;

Figure 4 is a horizontal section of a part of the device taken on line 4—4 of Fig. 1;

Figure 5 is a transverse vertical section taken on line 5—5 of Fig. 2, parts being omitted; and Figure 6 is a perspective view of one of the increment blocks.

Referring to the drawings in detail, the gauge comprises a base 10 having a guide channel 12 extending longitudinally thereof and having a back rest flange 14 extending upwardly from the part of the base which has the channel 12 formed therein. The base, including the channel portion and back flange portion, may conveniently be formed as a single casting, although this is not essential. The base 10 also carries an upright pin or standard 16 on which is mounted a bracket clamp 18. The bracket clamp 18 has a split ring portion 20 through which the standard 16 passes, and it may be clamped tightly upon such standard in any adjusted position by the clamping screw 22. The bracket clamp has a second split ring portion 24, the axis of which is at right angles to that of the split ring portion 20, and through the ring portion 24 passes a gauge supporting bar 26 which may be clamped in adjusted position in the split ring by a clamping screw 28. The bar 26 carries a gauge 30 having a dial 32 and an indicating hand 34, the gauge being mounted so that it may be rotated in its support carried by the bar 26 in a manner customary to such gauges.

The gauge 30 may be of any usual construction in which the hand is rotated by movement of the gauge plunger 36. The plunger 36 is arranged to be actuated, in the instance shown, by bell crank lever 38 which is mounted on a flexible hinge-plate 40 carried by bracket 42. The bracket and bell crank lever may be rotated about a vertical axis, so that the plane of the bell crank lever may be aligned with respect to the base of the instrument, irrespective of the angular adjustment of the clamp 18 and bar 26 about the standard 16, a clamp screw 39 being provided to hold the bracket in adjusted position.

Mounted in the channel 12 is a slide 50 having a T-shaped head 52 adapted to contact the tip 44 of the bell crank lever. Slight longitudinal movements of the slide are accordingly reflected by indications of the gauge pointer. The slide carries at its end remote from the contact head 52 and projecting from its upper surface a pin or point 54 having a conical or like tip adapted to enter the thread to be gauged.

Fixed in the end of the channel 12 is a block 58 which carries a fixed pin or point 60 with a conical or otherwise shaped end adapted to enter the thread to be gauged. The threaded member to be measured, which is indicated as a cap screw or bolt 62, is placed so that its threads rest on the fixed and movable points 60 and 54 and is pressed down thereon so that the points enter the threads.

In order to be certain that the threaded member is exactly centered over the points, so that the axes of the points pass through the axis of the threaded member, a rest bar or surface is provided which is preferably a plane surface lying parallel to the axes of the pins 54 and 60 and parallel in a longitudinal direction to the walls of the channel 12. In the construction illustrated, the pins 54 and 60 have vertical axes and the rest surface lies in a vertical plane. Preferably the rest bar is adjustable, so that its plane may be set nearer to or further from the axes of the points. In this way threaded members of different diameters may be accommodated. In the construction shown the back rest comprises a bar or plate 66 mounted on a pair of slide rods 68 which slide in holes in the flange 14. When the bar 66 rests against the flange 14, as shown in Fig. 5, it is adjusted to receive the maximum size of threaded member within the capacity of the device. The bar 66 is normally held in this position by the springs 72 compressed between the outside of flange 14 and the heads 74 on the slide rods 68.

In order to enable the device to be adjusted to gauge threaded members of less than the maximum diameter, a series of increment blocks 80 are provided, one of such blocks being shown in detail in Fig. 6. These blocks are made of definite thicknesses so that different blocks or combinations of blocks may be inserted to adjust the instrument to gauge threaded members of specified diameters. A convenient series of increment blocks is listed below with the threaded member diameters with which they should be used.

*Increment blocks*

|  | Thickness |
|---|---|
| No. 1 | $\frac{1}{32}$ |
| No. 2 | $\frac{1}{16}$ |
| No. 3 | $\frac{1}{8}$ |
| No. 4 | $\frac{1}{4}$ |
| No. 5 | $\frac{3}{8}$ |

With such a set of five blocks threaded members of diameters varying from $\frac{1}{4}''$ to $1\frac{1}{4}''$ by sixteenths may be gauged as indicated by the following examples:

*Use*

| Major Diameter of thread | Block No. | Block Thickness |
|---|---|---|
| $1\frac{1}{4}$ | none | 0 |
| $1\frac{3}{16}$ | 1 | $\frac{1}{32}$ |
| $1\frac{1}{8}$ | 2 | $\frac{1}{16}$ |
| 1 | 3 | $\frac{1}{8}$ |
| $\frac{5}{8}$ | 4, 2 | $\frac{1}{4}+\frac{1}{16}=\frac{5}{16}$ |
| $\frac{5}{16}$ | 5, 2, 1 | $\frac{3}{8}+\frac{1}{16}+\frac{1}{32}=\frac{15}{32}$ |
| $\frac{1}{4}$ | 5, 3 | $\frac{3}{8}+\frac{1}{8}=\frac{1}{2}$ |

The increment blocks are arranged to be supported between the flange 14 and bar 66 in any convenient manner. As illustrated, each increment block has a pair of notches 82 which receive the guide rods 68. The guide rods are pushed forward so as to space the bar 66 from the flange 14 and the proper increment block, or blocks are inserted, whereupon the springs 72 are permitted to draw the bar 66 tightly against the increment blocks and hold the parts in properly adjusted position. Each increment block is preferably provided with an upwardly projecting ear 84 properly marked to identify the block.

The slide 50 is conveniently provided with a series of indicia such as inch and half inch marks, one of which is adapted to be brought opposite the arrow 90 (Figs. 2 and 4) to adjust the instrument for a particular job, depending upon whether the threaded member to be gauged is relatively long or short.

In the use of the instrument, the proper increment block or blocks are first inserted between the plate or bar 66 and the flange 14, depending upon the diameter of the threaded member which is to be gauged. The slide is then adjusted to bring one of the inch marks opposite to the arrow 90, depending on whether it is desirable to gauge a long or short length of the thread; for instance, a half inch or a longer length, such as one or more inches. This adjustment determines the preliminary spacing of the gauge points 54 and 60. This preliminary adjustment of the slide 50 is made with the screw 22 loosened, so that the bracket carrying the gauge 30 may be swung about the standard 16. The gauge 30 is now adjusted so that the contact point 44 touches the contact head 52 of the slide with sufficient pressure such that the pointer 34 occupies an intermediate point of the dial somewhere near the zero. The screw 22 is then tightened up. During this process, if necessary, the screw 28 may be loosened and gauge supporting bar 26 adjusted longitudinally. The bracket 42 and bell crank lever are also adjusted so that the bell crank lever works in line with the axis of movement of the slide 50. The zero setting of the contact points 54 and 60 is preferably accomplished by applying a master threaded plug gauge of the diameter and thread lead required to the points 54 and 60. This determines the exact distance apart which the points should be and the gauge dial is then adjusted to bring the zero opposite to the pointer 34. The master plug gauge is then removed and the threaded members to be tested are successively applied to the points 54 and 60, care being taken that the threaded members rest against the rest bar or bar 66 and are firmly pressed against the points 54 and 60. Any deviation of the lead of the threads from that of the master plug gauge used to set the points will at once be indicated by the reading of the hand 34 on the dial 32. The testing of large numbers of threaded members may thus be rapidly carried out.

It will be seen that the instrument is of exceedingly simple and rugged construction and that parts are not likely to be displaced or damaged by extended use. Furthermore, the application of the threaded members to the gauge is very simple owing to the fact that the points upon which the threaded members are placed, occupy an upright position, and the threaded members are merely rested thereon, and against the preferably vertical surface of the rest bar or plate. The adjustment of the rest bar by use of the increment blocks is positive and once made does not permit of the rest bar getting out of adjustment, which might occur if a screw or micrometer adjustment were provided for the bar. Furthermore the correct setting is easily and certainly obtained by the use of increment blocks of known thickness.

While I have illustrated and described in detail one preferred form of my invention, it is to be understood that changes may be made therein and the invention embodied in other structures. I do not therefore desire to limit myself to the specific construction illustrated; but intend to cover my invention broadly in whatever form its principles may be utilized.

I claim:

1. In a lead gauge of the character described, a base, a slide mounted for longitudinal movement thereon, upwardly projecting pins carried by said base and slide and being formed for engagement with the threads of a threaded member to be gauged, when said threaded member is rested upon said pins, indicating gauge means associated with said slide to indicate small movements thereof, a back rest member associated with said base, an adjustable rest bar carried by said back rest member having a substantially vertical surface adapted to form a rest for a threaded member being gauged, and a removable increment block mounted between said back rest member and rest bar, for positioning said rest bar in a position to support the threaded member being gauged centrally over said pins so that it will rest on said pins by gravity.

2. In a lead gauge of the character described, a base, a slide mounted for longitudinal movement thereon, upwardly projecting pins carried by said base and slide and being formed for engagement with the threads of a threaded member to be gauged, indicating gauge means associated with said slide to indicate small movements thereof, an upright back rest member associated with said base, an adjustable rest bar carried by said back rest member and adapted to form a rest for engagement with the side of a threaded member being gauged, and a series of increment blocks of varying thickness inserted between said back rest member and said rest bar.

3. In a lead gauge of the character described, a base having a channel formed therein and having a back rest flange parallel with the channel, said back rest flange having a plurality of holes therethrough, guide rods mounted to slide in said holes, a rest bar carried by said guide rods, spring means for urging said guide rods into a retracted position in which said rest bar is moved towards said back rest flange, a removable increment block adapted to be inserted between said rest bar and said back rest flange, a slide mounted in said channel, a gauge pin carried by said slide and formed to engage the threads of a threaded member to be gauged, and visual indicating means for indicating movements of said slide.

4. A lead gauge as claimed in claim 3 in which the increment block comprises a plate having notches in its lower edge so that it may be dropped over the guide rods between the back rest flange and rest bar when the guide rods are moved forward to separate the rest bar from the flange.

WALTER SHERWOOD.

REFERENCES CITED

The following references are of record in the file of this patent:

UNITED STATES PATENTS

| Number | Name | Date |
| --- | --- | --- |
| 1,281,805 | Metzger et al. | Oct. 15, 1918 |
| 1,359,943 | Wilhelm | Nov. 23, 1920 |
| 2,080,534 | Darlington | May 18, 1937 |